United States Patent
Susella et al.

(10) Patent No.: US 9,425,961 B2
(45) Date of Patent: Aug. 23, 2016

(54) METHOD FOR PERFORMING AN ENCRYPTION OF AN AES TYPE, AND CORRESPONDING SYSTEM AND COMPUTER PROGRAM PRODUCT

(71) Applicant: STMicroelectronics S.r.l., Agrate Brianza (IT)

(72) Inventors: Ruggero Susella, Milan (IT); Silvia Mella, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 14/660,569

(22) Filed: Mar. 17, 2015

(65) Prior Publication Data

US 2015/0270967 A1    Sep. 24, 2015

(30) Foreign Application Priority Data

Mar. 24, 2014   (IT) .............................. TO2014A0243

(51) Int. Cl.
| | | |
|---|---|---|
| H04L 29/06 | (2006.01) | |
| H04L 9/30 | (2006.01) | |
| H04L 9/14 | (2006.01) | |
| H04L 9/00 | (2006.01) | |
| H04L 9/06 | (2006.01) | |

(52) U.S. Cl.
CPC .............. *H04L 9/3093* (2013.01); *H04L 9/003* (2013.01); *H04L 9/008* (2013.01); *H04L 9/0631* (2013.01); *H04L 9/14* (2013.01); *H04L 2209/24* (2013.01)

(58) Field of Classification Search
CPC .................................................... H04L 9/3093
See application file for complete search history.

(56) References Cited

U.S. PATENT DOCUMENTS

| | | | |
|---|---|---|---|
| 7,398,449 B1* | 7/2008 | Normoyle ........... | G06F 11/1016 714/767 |
| 8,437,473 B2 | 5/2013 | Gantman et al. | |
| 9,264,221 B2 | 2/2016 | Yung et al. | |
| 2006/0198524 A1* | 9/2006 | Sexton ................. | H04L 9/0631 380/277 |
| 2008/0189346 A1* | 8/2008 | Wu ........................ | G06F 7/726 708/492 |
| 2008/0267393 A1* | 10/2008 | Sano ..................... | H04L 9/0631 380/28 |
| 2009/0003598 A1* | 1/2009 | Itoh ........................ | H04L 9/003 380/46 |
| 2009/0172068 A1* | 7/2009 | Kounavis ................ | G06F 7/00 708/606 |
| 2010/0023572 A1* | 1/2010 | Dupaquis ............... | G06F 7/724 708/492 |
| 2010/0158241 A1* | 6/2010 | Gueron ............... | G06F 11/1076 380/28 |
| 2010/0322412 A1* | 12/2010 | Hung .................... | G06F 7/726 380/28 |
| 2011/0175645 A1* | 7/2011 | Hayasaka ........ | H03K 19/17772 326/41 |
| 2012/0170738 A1* | 7/2012 | Lablans .............. | H03M 13/158 380/28 |
| 2012/0237020 A1* | 9/2012 | Pruss .................... | H04L 9/0631 380/28 |
| 2014/0229741 A1* | 8/2014 | Mathew ................ | G06F 21/72 713/189 |
| 2014/0248929 A1* | 9/2014 | Noonan ................. | H04L 9/001 463/9 |
| 2015/0270950 A1* | 9/2015 | Michiels ............... | H04L 9/002 380/28 |
| 2016/0012237 A1* | 1/2016 | Eftekhari ............... | H04L 9/004 713/189 |

OTHER PUBLICATIONS

Cheon et al., "Batch Fully Homomorphic Encryption over the Integers," Eurocrypt 2013, LNCS 7881, pp. 315-335, 2013.
Gentry et al., "Homomorphic Evaluation of the AES Circuit," CRYPTO 2012, LNCS 7417, pp. 850-867, 2012.
Prouff et al., "Higher-Order Glitches Free Implementation of the AES using Secure Multi-Party Computation Protocols," CHES 2011, pp. 63-78, 2011.

* cited by examiner

*Primary Examiner* — Hadi Armouche
*Assistant Examiner* — Ali Shayanfar
(74) *Attorney, Agent, or Firm* — Seed IP Law Group PLLC

(57) ABSTRACT

A polynomial representation $(b_i(x))$ in an AES finite field $$\left(\frac{Z_2[x]}{(r(x))}\right)$$

of input bytes $(b_i)$ of a state matrix (B) is obtained. A plurality (1) of irreducible polynomials $(f_i(y))$ and a moving map $(\psi_i)$ are used to map each polynomial $(b_i(x))$ of the polynomial representation into a respective field of polynomials $$\left(\frac{Z_2[y]}{(f_i(y))}\right)$$

computed with respect to one of the irreducible polynomials $(f_i(y))$, to obtain respective moved polynomials $(\alpha_i(y))$. The moved polynomials $(\alpha_i(y))$ are mapped into a polynomial $(a(z))$ of a polynomial ring $$\left(\frac{Z_2[z]}{(p(z))}\right),$$

obtained by applying an isomorphism $(\omega)$ between the fields of polynomials $$\left(\frac{Z_2[y]}{(f_i(y))}\right)$$

and the polynomial ring $$\left(\frac{Z_2[z]}{(p(z))}\right)$$

based upon the Chinese remainder theorem (CRT). AES encryption is applied to the polynomial $(a(z))$. The polynomial $(a(z))$ is reconverted into the AES finite field $$\left(\frac{Z_2[x]}{(r(x))}\right)$$

to obtain an encrypted state matrix (CB).

23 Claims, 3 Drawing Sheets

METHOD FOR PERFORMING AN ENCRYPTION OF AN AES TYPE, AND CORRESPONDING SYSTEM AND COMPUTER PROGRAM PRODUCT

TECHNICAL FIELD

The present description relates to techniques for performing an encryption of an AES (Advanced Encryption Standard) type on data stored in data media.

Various embodiments may be applied to encryption of data contained in smartcards or set-top boxes.

DESCRIPTION OF RELATED ART

Electronic circuits that handle data considered confidential (not directly accessible by a non-authorized user) and their integrity or authenticity (which cannot be modified through a non-authorized circuit) generally contain elements or media for storage of the data in a given area considered safe, e.g., an area in which the signals cannot be used for identifying the data that are processed.

To protect the data in these areas, it is known to use symmetric-key block ciphers, such as the AES (Advanced Encryption Standard) algorithm. AES is a cryptographic algorithm that requires availability of a secret information, referred to as "key", for its computation. In order to discover the value of this key, it is known to use so-called "side channel" attacks, for example, that is, by exploiting information deriving from the physical implementation of the encryption procedure. The above side-channel attacks may be distinguished in active attacks and passive attacks.

An example of passive attack is represented by the DPA (Differential Power Analysis) technique, which envisages recording a large number of measurements of energy absorption, each being referred to an AES computation. There is then carried out a statistical analysis for correlating the key with the energy consumption.

An example of active attack is, instead, represented by the DFA (Differential Fault Analysis) technique, where the computation is altered through injection of an error (for example, using a laser beam). The result with errors is used together with the results free from errors to trace the key.

Side-channel attacks hence generally formulate hypotheses on the value of the key, which is unknown, and then correlate all the possible solutions with the recorded side-channel value.

This means that the hypothesis space is not very large (for example, less than $2^{64}$).

As is known, the AES technique operates with 128 data bits in blocks of 16 bytes, ordered in 4×4 matrices, which constitutes the so-called AES state, and is made up of multiple rounds, the number of which (10, 12, 14) depends upon the size of the key.

Each of these rounds comprises AES operations (SubBytes, ShiftRows, AddRoundKey, and MixColumns).

In this connection, FIG. 1 shows a flowchart representing an example of AES encryption procedure 100, in itself known. An AES plaintext state B is first subjected to an AddRoundKey operation in a step 110. There are then carried out rounds 120, which comprise a sequence of operations SubBytes 121, ShiftRows 122, MixColumns 123, and AddRoundKey 124. A key K is supplied through a block KeySchedule 140, which, given a key K, sends an appropriate subkey, or round key, SK, at each round, to the AddRoundKey operations. A last round 130 comprises the same operations as the round 120 except for the MixColumns operation 123 and supplies at output a ciphered state CB, also referred to as "ciphertext".

As may be noted, the structure of the round is simple. Decryption simply requires reversing the flow of the operations and the round keys.

The SubBytes and AddRoundKey operations are carried out on each byte separately.

The ShiftRows operation simply permutes the bytes, without changing them.

The MixColumns operation is carried out on four bytes separately (hence, four MixColumns operations are carried out at each round). By way of example, a MixColumns operation may be: $(b(x))=b(x)*(3x^3+x^2+x+2 \bmod x^4+1)$.

The SubBytes operation comprises two operations, an operation of inversion in the Galois field $GF(2^8)$ followed by an affine transformation. By way of example, a SubBytes operation may be: $(b(x))=b(x)^{-1} \bmod x^8+x^4+x^3+x+1)\cdot(x^7+x^6+x^5+x^4+1) \bmod x^8+1)+(x^7+x^6+x^2+x)$.

The AddRoundKey operation carries out an XOR between the bytes of the key and the bytes of the AES state and is equivalent to an addition in the Galois field $GF(2^8)$.

The fact that some of these operations are carried out on the bytes separately enables side-channel attacks that require only $16\cdot 2^8 (=4096)$ hypotheses.

Many countermeasures have been proposed against side-channel attacks. As regards passive attacks, the approach most commonly followed is to divide each input byte into two or more portions (or into mask and masked value) adding thereto random values and then computing the AES separately.

For attacks of a DFA type, masking or the use of multiple portions is not effective as countermeasure, and approaches are, instead, used based upon redundancy. During execution, this requires making the calculations twice and verifying whether the results are the same so as to check whether an error has been introduced into one of the calculations. As regards the data, alongside the 16-byte state a sort of checksum is inserted. At the end of execution, the checksum is correct only if the state is not affected by errors or if the checksum in turn has not been affected by an targeted error, even though this is a very difficult operation. Moreover, amongst active attacks, defense from the so-called Safe Error attacks is in general very difficult.

BRIEF SUMMARY

In an embodiment, a method for performing an encryption of an AES (Advanced Encryption Standard) type on data stored in data media comprises arranging said data to be subjected to AES encryption in a state matrix that comprises a plurality of input bytes ($b_i$), obtaining a polynomial representation ($b_i(x)$) in an AES finite field $$\left(\frac{Z_2[x]}{(r(x))}\right)$$

of the input bytes ($b_i$) of said state matrix (B) that is to be subjected to AES encryption, providing a plurality (1) of irreducible polynomials ($f_i(y)$) and mapping, using a moving map ($\psi_i$), each polynomial ($b_i(x)$) of said polynomial representation into a respective field of polynomials $$\left(\frac{Z_2[y]}{(f_i(y))}\right)$$

computed with respect to one of said irreducible polynomials ($f_i(y)$), to obtain respective moved polynomials ($\alpha_i(y)$); mapping ($\omega$) said moved polynomials ($\alpha_i(y)$) into a polynomial ($a(z)$) of a polynomial ring $$\left(\frac{Z_2[z]}{(p(z))}\right),$$

obtained by applying an isomorphism ($\omega$) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial ($a(z)$) representing the state matrix (B) in said polynomial ring $$\left(\frac{Z_2[z]}{(p(z))}\right);$$

applying an AES encryption procedure to said polynomial ($a(z)$) that represents the state matrix (B) in said polynomial ring $$\left(\frac{Z_2[z]}{(p(z))}\right);$$

reconverting ($\omega^{-1}, \psi_i^{-1}$) said polynomial ($a(z)$) that represents the state matrix (B) in said polynomial ring $$\left(\frac{Z_2[z]}{(p(z))}\right)$$

into the AES finite field $$\left(\frac{Z_2[x]}{(p(x))}\right)$$

to obtain an encrypted state matrix.

In an embodiment, the method comprises adding one or more randomization bytes to the bytes of the state matrix prior to said obtaining a polynomial representation ($b_i(x)$). In an embodiment, the method comprises adding one or more constant check bytes, or 'canary' bytes, to the state-matrix bytes prior to said obtaining a polynomial representation ($b_i(x)$). In an embodiment, the method comprises verifying that a constant check value obtained following upon said reconversion operation corresponds to an expected value in order to evaluate whether there has been an attack via error injection. In an embodiment, said isomorphism ($\omega$) based upon the Chinese remainder theorem (CRT) sets in relation a direct product of said quotient fields of a respective irreducible polynomial ($f_i(y)$) with said polynomial ring and is defined as $$(\alpha_0(y), \alpha_1(y), \ldots, \alpha_{l-1}(y)) \mapsto a(z) = \sum_{i=0}^{l-1} \alpha_i(z)\left(\frac{p(z)}{(f_i(z))}\right)\left[\left(\frac{p(z)}{f_i(z)}\right)^{-1}\right]_{f_i(z)}.$$

In an embodiment, the method comprises considering an integer number (l) of irreducible polynomials ($f_i(y)$), the value of said integer number (l) corresponding to the sum of the number of bytes of the AES state matrix (B), of the number of randomization bytes (R), and of the number of constant check bytes (C), or canary bytes. In an embodiment, the method comprises applying randomization bytes also to keys (K, SK) of the AES encryption procedure. In an embodiment, said operation of applying an AES encryption procedure comprises mapping the key (K) into the polynomial ring $$\left(\frac{Z_2[z]}{(p(z))}\right)$$

and computing an operation of key schedule of the AES encryption procedure in said polynomial ring $$\left(\frac{Z_2[z]}{(p(z))}\right).$$

In an embodiment, to carry out operations with arbitrary permutations, in particular the ShiftRows operation, the method comprises: building an operator vector having elements in the various fields $$\left(\frac{Z_2[y]}{(f_i(y))}\right),$$

the number of which is equal to the number (l) of irreducible polynomials, in said operator vector elements that, on the basis of the operation with arbitrary permutations that is carried out, do not change position contain the homogeneous first-degree monic polynomial (y), whereas for the other elements, which, on the basis of the operation, change from a position of first index (j) to the position of second index (k), there is present, in the position (k) of the operator vector, a root ($\sigma_j$) of the first-index polynomial ($f_j(y)$) computed in the quotient field $$\left(\frac{Z_2[y]}{(f_k(y))}\right)$$

of second index (k), in particular said root ($\sigma_j$) of the first-index polynomial ($f_j(y)$) being selected as the root whereby a root ($\rho_j$) of the moving map ($\psi_j$) of first index (j) evaluated in said root ($\sigma_j$) of the first-index polynomial ($f_j(y)$) is equal to a root ($\rho_k$) of the moving map ($\psi_k$) of said second index (k), in particular according to the following relation:

$$\rho_j(\sigma_j)=\rho_k;$$

obtaining a map of said operation with arbitrary permutations (ShiftRows(z)) by applying to said vector thus built said isomorphism ($\omega$) based upon the Chinese remainder theorem; and computing the operation with arbitrary permutations evaluating the state in said operation map (ShiftRows(z)).

In an embodiment, an apparatus comprises circuitry configured to perform an encryption of an AES type according to a method disclosed herein. In an embodiment, the apparatus comprises a smart card. In an embodiment, the apparatus comprises a set-top box. In an embodiment, a computer program product that can be loaded into the memory of at least one computer, comprises portions of software code for implementing a method as disclosed herein when it is run on said at least one processing device.

In an embodiment, a method comprises: mapping polynomial representations in Advanced Encryption Standard (AES) finite field of bytes of a state matrix into respective fields of polynomials computed with respect to one of a plurality of irreducible polynomials, generating moved polynomials; applying Chinese-Remainder-Theorem (CRT) based mapping to the generated moved polynomials, generating a polynomial representing the state matrix in a polynomial ring; applying an AES process to the polynomial representing the state matrix in the polynomial ring, generating an AES-processed polynomial; and converting the AES-processed polynomial into the AES finite field, generating an AES-processed state matrix. In an embodiment, the AES process is an AES encryption process and the generated AES-processed state matrix is an encrypted state matrix. In an embodiment, the method comprises: generating the state matrix, the generating the state matrix including adding one or more randomization bytes to bytes of a matrix of data to be processed. In an embodiment, the generating the state matrix includes adding one or more check bytes to bytes of the matrix of data to be processed. In an embodiment, the method comprises: generating the state matrix, the generating the state matrix including adding one or more check bytes to bytes of a matrix of data to be processed. In an embodiment, the method comprises: verifying a check value in the AES processed state matrix corresponds to an expected value. In an embodiment, the method comprises: obtaining the polynomial representation ($b_i(x)$) in the AES finite field $$\left(\frac{Z_2[x]}{(r(x))}\right)$$

of the input bytes ($b_i$) of said state matrix (B); providing the plurality of irreducible polynomials ($f_i(y)$) and mapping, using a moving map ($\psi_i$), each polynomial ($b_i(x)$) of said polynomial representation into the respective field of polynomials $$\left(\frac{Z_2[y]}{(f_i(y))}\right)$$

computed with respect to one of said irreducible polynomials ($f_i(y)$), to obtain the respective moved polynomials ($\alpha_i(y)$); mapping said moved polynomials ($\alpha_i(y)$) into a polynomial ($a(z)$) of the polynomial ring $$\left(\frac{Z_2[z]}{(p(z))}\right),$$

obtained by applying an isomorphism ($\omega$) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial ($a(z)$) representing the state matrix (B) in said polynomial ring $$\left(\frac{Z_2[z]}{(p(z))}\right);$$

applying the AES process to said polynomial ($a(z)$) that represents the state matrix (B) in said polynomial ring $$\left(\frac{Z_2[z]}{(p(z))}\right);$$

and reconverting said polynomial ($a(z)$) that represents the state matrix (B) in said polynomial ring $$\left(\frac{Z_2[z]}{(p(z))}\right)$$

into the AES finite field $$\left(\frac{Z_2[x]}{(r(x))}\right)$$

to obtain an encrypted state matrix (CB).

In an embodiment, said isomorphism ($\omega$) is defined as $$(\alpha_0(y), \alpha_1(y), \ldots, \alpha_{l-1}(y)) \mapsto a(z) = \sum_{i=0}^{l-1} \alpha_i(z)\left(\frac{p(z)}{f_i(z)}\right)\left[\left(\frac{p(z)}{f_i(z)}\right)^{-1}\right]_{f_i(z)}.$$

In an embodiment, a number of the plurality of irreducible polynomials is equal to a sum of a number of bytes of the AES state matrix (B), of a number of added randomization bytes, and of a number of added check bytes. In an embodiment, the method comprises adding one or more randomization bytes to keys of the AES process. In an embodiment, said applying an AES process comprises mapping a key into the polynomial ring. In an embodiment, a ShiftRows operation of the AES procedure comprises: building an operator vector having elements in various fields $$\left(\frac{Z_2[y]}{(f_i(y))}\right),$$

a number of which is equal to a number of irreducible polynomials of the plurality of irreducible polynomials and using arbitrary permutations of the elements, wherein elements that do not change position contain a homogeneous first-degree monic polynomial (y), and elements which change from a position of first index (j) to a position of second index (k), there is present, in the position (k) of the operator vector, a root ($\sigma_j$) of a first-index polynomial ($f_j(y)$)) computed in a quotient field $$\left(\frac{Z_2[y]}{(f_k(y))}\right)$$

of second index (k), said root ($\sigma_j$) of the first-index polynomial ($f_j(y)$) being selected as the root whereby a root ($\rho_j$) of a moving map ($\psi_j$) of first index (j) evaluated in said root ($\sigma_j$) of the first-index polynomial ($f_j(y)$) is equal to a root ($\rho_k$) of the moving map ($\psi_k$) of said second index (k), according to the following relation:

$\rho_j(\sigma_j) = \rho_k;$ obtaining a map of said operation with arbitrary permutations (ShiftRows(z)) by applying to said vector said isomorphism ($\omega$) based upon the Chinese remainder theorem; and computing the operation with arbitrary permutations evaluating the state in said operation map (ShiftRows(z)).

In an embodiment, a device comprises: one or more memories; and one or more processing devices, wherein the one or more memories and the one or more processing devices are configured to: map polynomial representations in an Advanced Encryption Standard (AES) finite field of bytes of a state matrix into respective fields of polynomials computed with respect to one of a plurality of irreducible polynomials, generating moved polynomials; apply Chinese-Remainder-Theorem (CRT) based mapping to the generated moved polynomials, generating a polynomial representing the state matrix in a polynomial ring; apply an AES process to the polynomial representing the state matrix in the polynomial ring, generating an AES-processed polynomial; and convert the AES-processed polynomial into the AES finite field, generating an AES-processed state matrix. In an embodiment, the AES process is an AES encryption process and the generated AES-processed state matrix is an encrypted state matrix. In an embodiment, the one or more memories and the one or more processing devices are configured to: generate the state matrix, the generating the state matrix including adding one or more randomization bytes to bytes of a matrix of data to be processed. In an embodiment, the generating the state matrix includes adding one or more check bytes to bytes of the matrix of data to be processed. In an embodiment, the one or more memories and the one or more processing devices are configured to: generating the state matrix, the generating the state matrix including adding one or more check bytes to bytes of a matrix of data to be processed. In an embodiment, the one or more memories and the one or more processing devices are configured to: verifying a check value in the AES processed state matrix corresponds to an expected value. In an embodiment, the one or more memories and the one or more processing devices are configured to: obtain the polynomial representation ($b_i(x)$) in the AES finite field $$\left(\frac{Z_2[x]}{(r(x))}\right)$$

of the input bytes ($b_i$) of said state matrix (B); provide the plurality of irreducible polynomials ($f_i(y)$) and map, using a moving map ($\psi_i$), each polynomial ($b_i(x)$) of said polynomial representation into the respective field of polynomials $$\left(\frac{Z_2[y]}{(f_i(y))}\right)$$

computed with respect to one of said irreducible polynomials ($f_i(y)$), to obtain the respective moved polynomials ($\alpha_i(y)$); map said moved polynomials ($\alpha_i(y)$) into a polynomial (a(z)) of the polynomial ring $$\left(\frac{Z_2[z]}{(p(z))}\right),$$

obtained by applying an isomorphism ($\omega$) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial (a(z)) representing the state matrix (B) in said polynominal ring $$\left(\frac{Z_2[z]}{(p(z))}\right);$$

apply the AES process to said polynomial (a(z)) that represents the state matrix (B) in said polynomial ring $$\left(\frac{Z_2[z]}{(p(z))}\right);$$

and reconvert said polynomial (a(z)) that represents the state matrix (B) in said polynomial ring $$\left(\frac{Z_2[z]}{(p(z))}\right)$$

into the AES finite field $$\left(\frac{Z_2[x]}{(r(x))}\right)$$

to obtain an encrypted state matrix (CB). In an embodiment, said isomorphism (ω) is defined as $$(\alpha_0(y), \alpha_1(y), \ldots, \alpha_{l-1}(y)) \mapsto a(z) = \sum_{i=0}^{l-1} \alpha_i(z) \left(\frac{p(z)}{f_i(z)}\right) \left[\left(\frac{p(z)}{f_i(z)}\right)^{-1}\right]_{f_i(z)}.$$

In an embodiment, a system comprises: one or more inputs configured to receive and output data; and Advanced Encryption Standard (AES) cyphering circuitry coupled to the one or more inputs and configured to: map polynomial representations in an AES finite field of bytes of a state matrix into respective fields of polynomials computed with respect to one of a plurality of irreducible polynomials, generating moved polynomials; apply Chinese-Remainder-Theorem (CRT) based mapping to the generated moved polynomials, generating a polynomial representing the state matrix in a polynomial ring; apply an AES process to the polynomial representing the state matrix in the polynomial ring, generating an AES-processed polynomial; and convert the AES-processed polynomial into the AES finite field, generating an AES-processed state matrix. In an embodiment, the AES process is an AES decryption process and the generated AES-processed state matrix is a decrypted state matrix. In an embodiment, the cyphering circuitry is configured to: obtain the polynomial representation ($b_i(x)$) in the AES finite field $$\left(\frac{Z_2[x]}{(r(x))}\right)$$

of the input bytes ($b_i$) of said state matrix (B); provide the plurality of irreducible polynomials ($f_i(y)$) and map, using a moving map ($\psi_i$), each polynomial ($b_i(x)$) of said polynomial representation into the respective field of polynomials $$\left(\frac{Z_2[y]}{(f_i(y))}\right)$$

computed with respect to one of said irreducible polynomials ($f_i(y)$), to obtain the respective moved polynomials ($\alpha_i(y)$); map said moved polynomials ($\alpha_i(y)$) into a polynomial ($a(z)$) of the polynomial ring $$\left(\frac{Z_2[z]}{(p(z))}\right),$$

obtained by applying an isomorphism (ω) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial ($a(z)$) representing the state matrix (B) in said polynomial ring $$\left(\frac{Z_2[z]}{(p(z))}\right);$$

apply the AES process to said polynomial ($a(z)$) that represents the state matrix (B) in said polynomial ring $$\left(\frac{Z_2[z]}{(p(z))}\right);$$

and reconvert said polynomial ($a(z)$) that represents the state matrix (B) in said polynomial ring $$\left(\frac{Z_2[z]}{(p(z))}\right)$$

into the AES finite field $$\left(\frac{Z_2[x]}{(r(x))}\right)$$

to obtain an encrypted state matrix (CB). In an embodiment, the system comprises at least one of: smart-card circuitry; and set-top box circuitry.

In an embodiment, a non-transitory computer-readable medium's contents configure an Advanced Encryption Standard (AES) cyphering circuit to perform a method, the method comprising: mapping polynomial representations in an AES finite field of bytes of a state matrix into respective fields of polynomials computed with respect to one of a plurality of irreducible polynomials, generating moved polynomials; applying Chinese-Remainder-Theorem (CRT) based mapping to the generated moved polynomials, generating a polynomial representing the state matrix in a polynomial ring; applying an AES process to the polynomial representing the state matrix in the polynomial ring, generating an AES-processed polynomial; and converting the AES-processed polynomial into the AES finite field, generating an AES-processed state matrix. In an embodiment, the AES process is an AES decryption process and the generated AES-processed state matrix is a decrypted state matrix. In an embodiment, the method comprises: obtaining the polynomial representation ($b_i(x)$) in the AES finite field $$\left(\frac{Z_2[x]}{(r(x))}\right)$$

of the input bytes ($b_i$) of said state matrix (B); providing the plurality of irreducible polynomials ($f_i(y)$) and mapping, using a moving map ($\psi_i$), each polynomial ($b_i(x)$) of said polynomial representation into the respective field of polynomials $$\left(\frac{Z_2[y]}{(f_i(y))}\right)$$

computed with respect to one of said irreducible polynomials ($f_i(y)$), to obtain the respective moved polynomials ($\alpha_i(y)$); mapping said moved polynomials ($\alpha_i(y)$) into a polynomial ($a(z)$) of the polynomial ring $$\left(\frac{Z_2[z]}{(p(z))}\right),$$

obtained by applying an isomorphism ($\omega$) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial ($a(z)$) representing the state matrix (B) in said polynomial ring $$\left(\frac{Z_2[z]}{(p(z))}\right);$$

applying the AES process to said polynomial ($a(z)$) that represents the state matrix (B) in said polynomial ring $$\left(\frac{Z_2[z]}{(p(z))}\right);$$

and reconverting said polynomial ($a(z)$) that represents the state matrix (B) in said polynomial ring $$\left(\frac{Z_2[z]}{(p(z))}\right)$$

into the AES finite field $$\left(\frac{Z_2[x]}{(r(x))}\right)$$

to obtain an encrypted state matrix (CB).

Various embodiments may provide a reasonable synthesis between safety from attacks and computational speed. Various embodiments may hence envisage representation of the AES state as a polynomial in a polynomial ring obtained via an isomorphism and execution in the aforesaid polynomial ring of the AES encryption operations, achieving safety against attacks, in particular passive attacks, which derives from increase of a hypothesis space and from the greater interdependence of the changes carried out on bits of the AES state. Various embodiments may envisage adding randomization bytes to the bytes subjected to isomorphism in order to increase safety in regard to active attacks. Various embodiments may envisage adding further constant check bytes (referred to as 'canary' bytes), in particular as a safety measure against techniques based upon error injection.

BRIEF DESCRIPTION OF THE SEVERAL VIEWS OF THE DRAWINGS

Various embodiments will now be described, purely by way of example, with reference to the annexed figures, wherein.

DETAILED DESCRIPTION

In the ensuing description numerous specific details are provided in order to facilitate as much as possible understanding of the embodiments provided by way of example. The embodiments may be implemented with or without specific details, or else with other methods, components, materials, etc. In other cases, structures, materials, or operations that are well known are not shown or described in detail so that aspects of the embodiments will not be obscured. Reference in the framework of the present description to "an embodiment" or "one embodiment" means that a given peculiarity, structure, or characteristic described in connection with the embodiment is comprised in at least one embodiment. Hence, recurrence of phrases such as "in an embodiment" or "in one embodiment" in various points of the present description does not necessarily refer to one and the same embodiment. Moreover, the peculiarities, structures, or characteristics may be combined in any convenient way in one or more embodiments.

The notations and references are here provided only for convenience of the reader and do not define the scope or the meaning of the embodiments.

Figure 2:
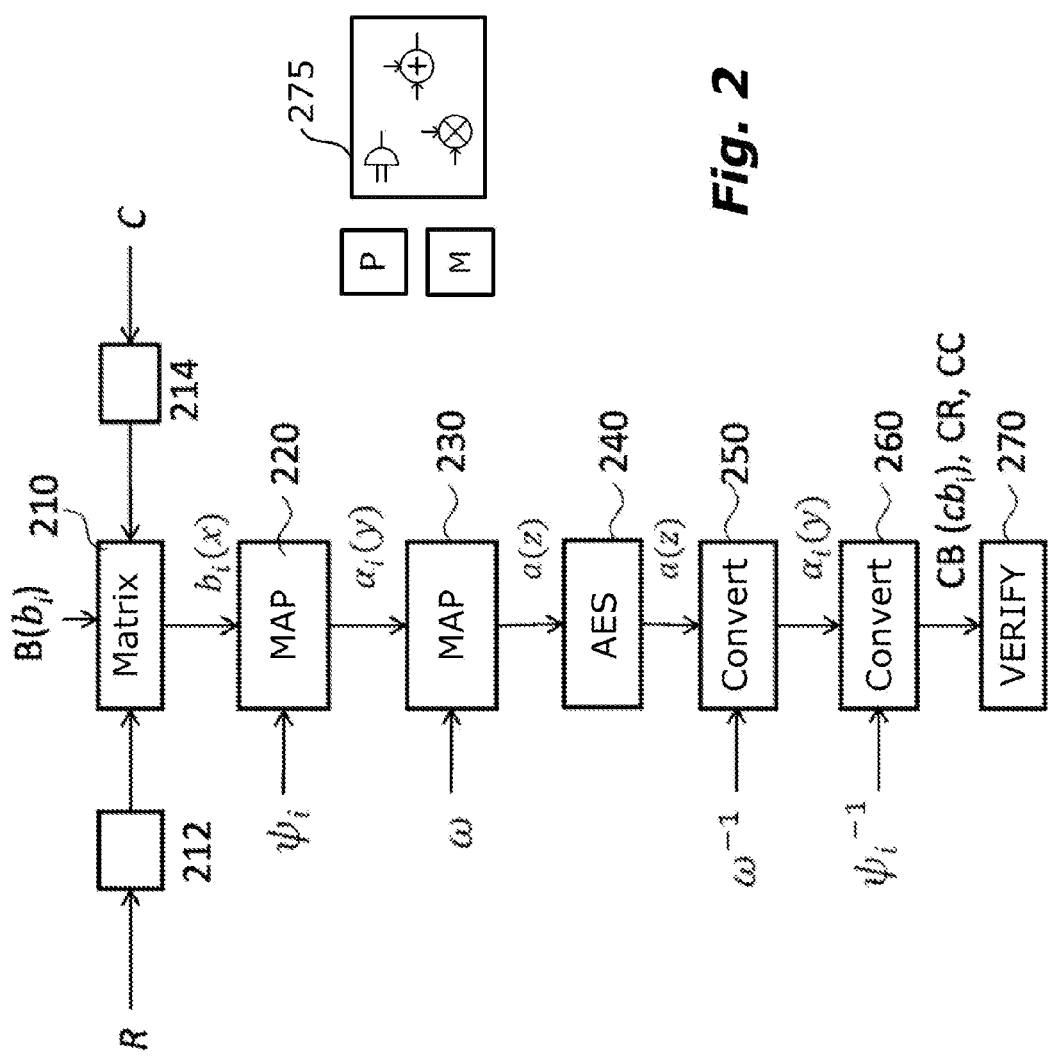
FIG. 2 shows a flowchart exemplifying an embodiment of a method and device.

In what follows, with reference to FIG. 2, a flowchart is described representing operations of an embodiment of a method. As illustrated, the method of FIG. 2 is implemented using one or more processing devices P, one or more memories M, such as one or more registers, and discrete circuitry 275.

It is envisaged to operate via an embodiment of an AES encryption method that comprises the operations indicated in what follows.

Considering that the AES state B is formed by 128 bits arranged in 16 bytes $b_i$, where the index i ranges from 0 to 15, in the first place there is envisaged an operation 210 of representation of each i-th input byte $b_i$ of the AES state matrix B as a polynomial $b_i$, (x) in the AES finite field $$\frac{Z_2[x]}{(r(x))},$$

which is isomorphic to the Galois field GF($2^8$), e.g., the field of polynomials having maximum degree $x^7$ with coefficients in the field GF(2). As is known, this envisages that the bits of each input byte $b_i$ of the AES state B constitute the coefficients of a polynomial on the field $Z_2$, e.g., the field of the integers modulo 2.

$$\frac{Z_2[x]}{(r(x))}$$

is hence the AES polynomial field, e.g., the field of the polynomials with coefficients in the field $Z_2$ defined by the irreducible AES polynomial $r(x)=x^8+x^4+x^3+x+1$.

The method described in FIG. 2 further comprises an operation 212 of addition of randomization bytes R, which are in turn regarded as polynomials in the AES finite field, as well as an operation of addition 214 of a constant check value C, which is also referred to as 'canary' value. It should be noted that it is possible to add in this operation 214 one or more different constant values C, e.g., one or more canary values.

It is then envisaged to provide a plurality of irreducible polynomials $f_i(y)$ and carry out an operation 220 of moving, or mapping, each polynomial $b_i(x)$ corresponding to an input byte $b_i$ of the AES state B regarded as polynomial, into a respective and different field of polynomials, or quotient ring, $$\frac{Z_2[y]}{(f_i(y))}$$

associated to one of the aforesaid irreducible polynomials $f_i(y)$.

It should be noted that in general by $$\frac{Z_2[y]}{(f_i(y))}$$

is meant the field of polynomials with coefficients in $Z_2$ defined by a generic i-th irreducible polynomial $f_i(y)$, where the index i ranges from zero to 1-1, where 1 is the integer number of irreducible polynomials considered for the method, and corresponds to taking the ring of all the polynomials with coefficients in the field $Z_2$ and with variable y, and to taking moreover the respective quotient ring defined by the polynomial $f_i(y)$. If the generic polynomial $f_i(y)$ is irreducible in the field $Z_2$, the quotient ring is a finite field.

The aforesaid moving operation 220 involves also the randomization bytes R and the constant check value C, for which corresponding irreducible polynomials $f_i(y)$ are introduced. As has been mentioned, in fact, an integer number 1 of different irreducible polynomials $f_i(y)$ is chosen corresponding to fields isomorphic to $$\frac{Z_2[x]}{(r(x))},$$

with the index i of the fields that ranges from zero to 1-1. Since the operation 220 envisages moving each byte into a respective field defined by a respective irreducible polynomial, the number 1 is chosen as a function of the number of bytes to be moved. In the case provided by way of example, the number 1 is equal to 16, plus the number of the bytes R and C. The polynomials $b_i(x)$ moved (or mapped) into the respective fields associated to the irreducible polynomials $f_i(y)$, e.g., into $$\frac{Z_2[y]}{(f_i(y))},$$

are referred to herein as "moved polynomials" $\alpha_i(y)$.

Figure 3:
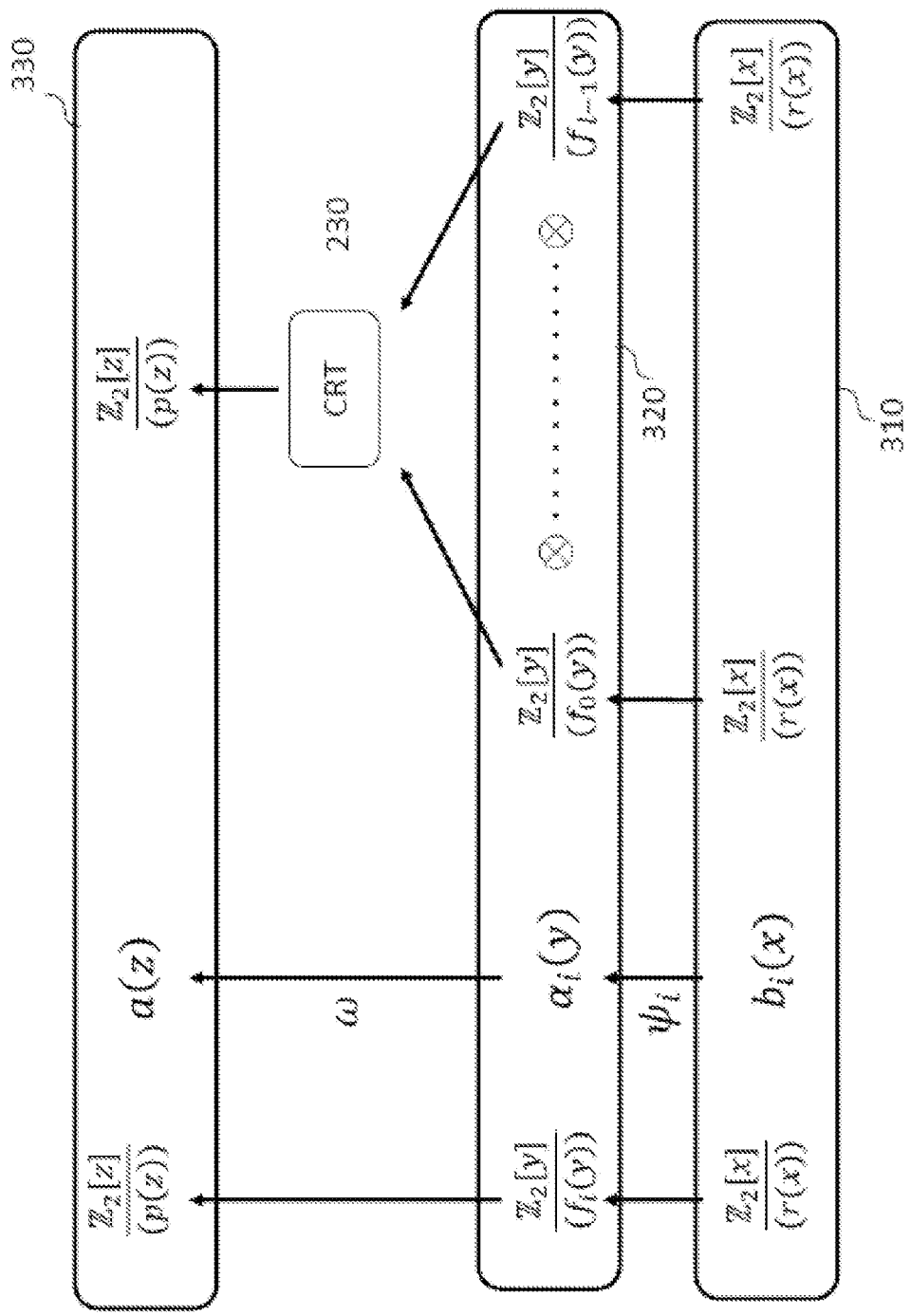
FIG. 3 shows a block diagram illustrating operations of an embodiment of a method.

The above operation 220 of movement or mapping of the polynomials $b_i(x)$ that represent the bytes of the AES state matrix B into the moved polynomials $\alpha_i(y)$ can be defined via a map $\psi_i$ that is defined more fully in what follows with reference to FIG. 3.

There is then envisaged an operation 230 of mapping said moved polynomials $\alpha_i(y)$ into a polynomial $a(z)$ of a polynomial ring $$\frac{Z_2[z]}{(p(z))}.$$

This occurs via an isomorphism, based upon the Chinese remainder theorem (CRT), e.g., a biunique application for linking the direct product of the fields $$\frac{Z_2[y]}{(f_i(y))}$$

with a polynomial ring $$\frac{Z_2[z]}{(p(z))},$$

where $p(z)=\Pi_{i=0}^{l-1}f_i(z)$ indicates the polynomial product of the 1 irreducible polynomials $f_i(y)$ chosen for the operation 220. In particular, hence, via the CRT, given a polynomial with coefficients in $Z_2$ with a factoring in irreducible polynomials, there is obtained the isomorphism between the ring defined by the polynomial and the direct product of the fields defined by its irreducible factors. With reference to FIG. 3, described in the sequel of the present description is a map ω that implements the isomorphism of the operation 230.

Denoted by $a(z)$ is a polynomial element of the above polynomial ring $$\frac{Z_2[z]}{(p(z))},$$

which corresponds, through the isomorphism defined by the CRT, to the moved bytes $\alpha_i(y)$ (according to what is defined, for example, by the map ω). Hence, the operation 230 builds, by applying the CRT, a large polynomial $a(z)$, which represents the entire AES state B in the ring $$\frac{Z_2[z]}{(p(z))}.$$

As indicated in what follows, the operation 230 enables the AES encryption operations to be carried out, instead of in the normal AES field, in the polynomial ring $$\frac{Z_2[z]}{(p(z))},$$

and then, via a conversion, it is possible to return to the normal AES field $$\frac{Z_2[x]}{(r(x))}.$$

Since the above large polynomial a(z), in the preferred embodiment described in FIG. 2, is built by applying the isomorphism not only to the polynomials $b_i(x)$ of the AES plaintext state B, but also to polynomials corresponding to the randomization bytes R and to the constant check bytes C, also the AES state represented by the polynomial a(z) is randomized. Following upon step 230 that builds the large polynomial a(z) applying the CRT, it is then envisaged to carry out an operation of AES encryption 240 by applying to the large polynomial a(z), which represents the AES state, for example a procedure like the procedure 100 described with reference to FIG. 1.

Next, in a step 250, the large polynomial a(z) is reconverted as determined by the operation of AES encryption 240 into the l moved polynomials $\alpha_i(y)$ associated to each different irreducible polynomial $f_i(y)$ (e.g., by applying an inverse map, or isomorphism, $\omega^{-1}$ described with reference to FIG. 3).

Next, a step 260 is envisaged of conversion of the above polynomials $\alpha_i(y)$ once again into polynomials $b_i(x)$ (for example, via inversion of the map $\psi$), e.g., into bytes $b_i$ of the AES state matrix. Now, however, there is obtained an AES encrypted state CB, or ciphertext, which comprises AES encrypted bytes $cb_i$ plus encrypted randomization bytes CR, which are hence different from the ones introduced originally, since AES encryption operations have been carried out thereon (step 240).

It should be noted that also the outputs of steps 240 and 250, e.g., the state a(z) and the polynomials $\alpha_i(y)$, are encrypted and are consequently different from the outputs of steps 220 and 230, but for reasons of uniformity this is not herein developed explicitly in the notation.

For the same reason already discussed with reference to the randomization bytes R also an encrypted constant check value CC obtained in the above step 260 will differ from the original constant check value C entered in step 212. However, the expected value, e.g., the value that, following upon the operation 240, should be assumed by the encrypted constant check value CC, can be calculated beforehand, and hence is known.

Consequently, a check may be made to verify, in a step 270, whether the constant check value CC, after step 260, corresponds to the aforesaid expected value. If it does, it can be assumed that there has not been error injection during the encryption process, whereas if it does not there may have been error injection.

FIG. 3 shows a block diagram that represents an embodiment of a method illustrating the conversions between the various fields.

Hence, designated by 310 is a representation of the AES finite field $$\frac{Z_2[x]}{(r(x))}$$

in which the bytes $b_i(x)$ of the AES state B are represented as polynomials.

Designated by 320 is a representation of the field $$\frac{Z_2[y]}{(f_i(y))}$$

of polynomials with coefficients in $Z_2$ defined by a generic i-th irreducible polynomial $f_i(y)$ where the polynomials corresponding to the moved bytes $\alpha_i(y)$ are represented.

From the representation 310 we pass to the representation 320 by applying a moving map $\psi_i$, which moves the elements $b_i(x)$, e.g., the polynomials associated to the bytes $b_i$ of the AES state B, into the elements $\alpha_i(y)$, e.g., the polynomials that represent the moved bytes over the various fields corresponding to the irreducible polynomials $f_i(y)$. This moving map $\psi_i$ comprises complex rotations that will be described in detail hereinafter.

Designated by 330 is the representation of the polynomial ring $$\frac{Z_2[z]}{(p(z))},$$

having as elements the polynomials a(z). As has been said, the above polynomial ring $$\frac{Z_2[z]}{(p(z))}$$

is obtained by applying the CRT (230).

From the representation 320 we pass to the representation 330 by applying a CRT map $\omega$, which moves the elements $\alpha_i(y)$, which are the polynomials that represent the moved bytes over the various fields corresponding to the irreducible polynomials $f_i(y)$, into the polynomial a(z), e.g., which moves the various quotient fields $$\frac{Z_2[y]}{(f_i(y))}$$

into the polynomial ring $$\frac{Z_2[z]}{(p(z))};$$

namely, $$\omega: \frac{Z_2[y]}{(f_0(y))} \otimes \frac{Z_2[y]}{(f_1(y))} \otimes \ldots \otimes \frac{Z_2[y]}{(f_{l-1}(y))} \to \frac{Z_2[z]}{(p(z))}$$

The above CRT map $\omega$ is defined by the CRT as $$(\alpha_0(y), \alpha_1(y), \ldots, \alpha_{l-1}(y)) \mapsto a(z) = \sum_{i=0}^{l-1} \alpha_i(z) \left(\frac{p(z)}{f_i(z)}\right) \left[\left(\frac{p(z)}{f_i(z)}\right)^{-1}\right]_{f_i(z)}$$

Its inverse map, $\omega^{-1}$, is defined as:

a(y)mod $f_1(y), \ldots,$ a(y)mod $f_{l-1}(y)$

The direct product creates a space in which the operations are carried out component by component. For example, if we consider two entries represented by 16 bytes, respectively $b1_i(x)$ and $b2_j(x)$, with the index i ranging from 0 to 1-1, we convert them into the polynomial ring $$\frac{Z_2[z]}{(p(z))}$$

as polynomials a 1(z) and a2(z), respectively, then we compute a third converted polynomial a3(z)=a1(z)·a2(z), and we convert a3(z) into 16 elements of the AES finite field $$\frac{Z_2[x]}{(r(x))},$$

the relation is maintained, so that $b3_i(x)=b1_i(x)\cdot b2_i(x)$ with the index i ranging from 0 to 1-1. Hence, basically, a multiplication carried out in the polynomial ring $$\frac{Z_2[z]}{(p(z))}$$

corresponds to 16 multiplications of the corresponding elements in the AES finite field $$\frac{Z_2[x]}{(r(x))}.$$

An embodiment exploits this property. In fact, if it is necessary to multiply, for example, all the bytes of the state B by x+1, first x+1 is encoded into all the bytes $b_i(x)$ and then these are converted into the polynomial ring $$\frac{Z_2[z]}{(p(z))}$$

as a single large polynomial to be multiplied by the state. On the basis of what has been indicated, an example of how the AES encryption operation 240 is carried out in an embodiment of a method is now described.

Before performing the above computation, all the round keys SK are generated. The normal key schedule of the AES procedures, 10 for AES-128, 12 for AES-192, 14 for AES-256 is, for example, used. Then the plaintext B is converted from polynomials corresponding to the bytes $b_i(x)$ to the large polynomial a(z), and the same is carried out for each of the round keys SK, thus obtaining converted keys, here denoted by $k_{Rm}(z)$, where m is the number of the round.

Figure 1:
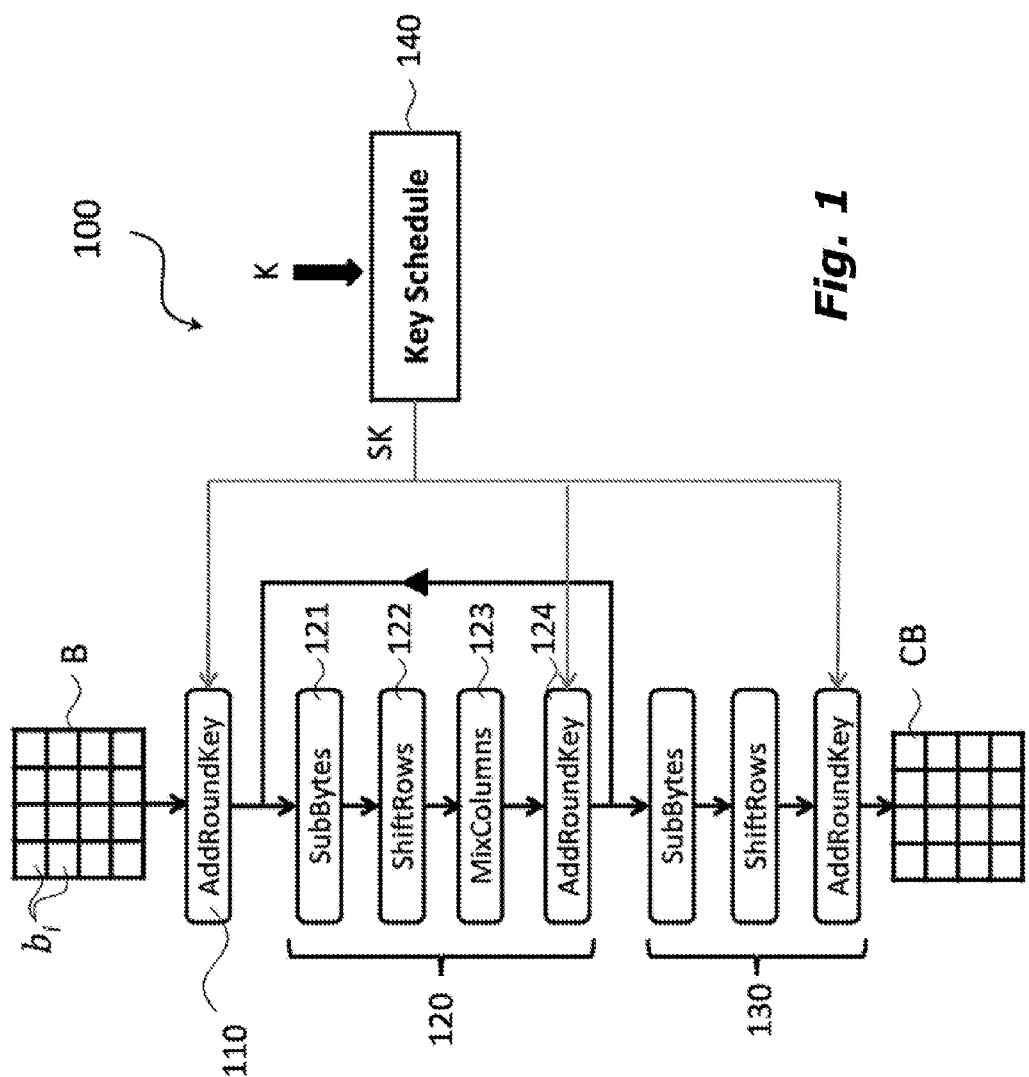
FIG. 1 shows a block diagram of an AES encryption method according to the known art.

Then all the operations of the AES procedure are carried out, such as, for example, the procedure 100 indicated in FIG. 1, in the polynomial ring $$\frac{Z_2[z]}{(p(z))}.$$

Then the large polynomial thus obtained is converted into $$\frac{Z_2[x]}{(r(x))}.$$

Described herein in greater detail is implementation of the operations 121, 122, 123, 124, carried out at each round 120 in the polynomial ring $$\frac{Z_2[z]}{(p(z))}$$

at step 240.

The AddRoundkey operation 121 in the AES finite field $$\frac{Z_2[x]}{(r(x))}$$

comprises of a sum of the state and the key. This does not change in the polynomial ring $$\frac{Z_2[z]}{(p(z))}.$$

Hence,
$$a(z)=\text{AddRoundKey}(a(z),k_{Rm}(z))=a(z)+k_{Rm}(z)$$

As regards the SubBytes operation 122, as mentioned previously, in the AES finite field $$\frac{Z_2[x]}{(r(x))}$$

it corresponds to an inversion in $GF(2^8)$ plus an affine transformation. The inversion in $GF(2^8)$, by virtue of the small Fermat theorem, is equivalent to raising to a power, with exponent 254. Consequently, the inversion in $$\frac{Z_2[z]}{(p(z))}$$

is computed as $a(z)^{254}$.

The affine transformation can be computed as $$T(b(z)) = \delta + \sum_{i=0}^{7} \gamma_i \cdot b(z)^{2^i}$$

where $\delta$ and $\gamma_i$ are constant polynomials, defined in the AES field.

The method according to an embodiment adopts the same procedure also in the polynomial ring $$\frac{Z_2[z]}{(p(z))}.$$

There is evaluated $a(z)^{2^i}$, with the index i ranging from 0 to 7, and then, for each constant, a large polynomial is created that encodes each constant polynomial in each byte. We denote by d(z) the polynomial that encodes the constant δ and by $g_i(z)$ the polynomial that encodes the constant $\gamma_i$, and then the following computation is made:

$$T(a(z)) = d(z) + \sum_{i=0}^{7} g_i(z) \cdot a(z)^{2^i}$$

As regards the operations ShiftRows 123 and MixColumns 124, the ShiftRows operation comprises a rotation of bytes, which is computed through a polynomial evaluation described more fully hereinafter.

As regards the MixColumns operation, if in the normal AES field the state B is defined as $$B = \begin{bmatrix} b_0 & b_1 & b_2 & b_3 \\ b_4 & b_5 & b_6 & b_7 \\ b_8 & b_9 & b_{10} & b_{11} \\ b_{12} & b_{13} & b_{14} & b_{15} \end{bmatrix}$$

and the notation (B<<<4) indicates a rotation to the left by 4 positions of the bytes $b_i$ in the state B, we can write the MixColumns operation as MixColumns(B)=x·B+(x+1)·(B<<<4)+(B<<<8)+ (B<<<12)

Computation of the MixColumns operation 123 in the polynomial ring $$\frac{Z_2[z]}{(p(z))}$$

is carried out in a similar way:
- first the polynomial evaluations are used to carry out the 4 rotations of the state, which are in turn stored as different states;
- x and x+1 are encoded in two different states, in a way similar to what has been described previously for the constants δ and $\gamma_i$ of the affine transformation; and
- then the multiplications and additions are carried out as in the MixColumns formula appearing above.

Implementation of the operations of computation 240 of the AES encryption just described presents similarities with the computation procedure described in Gentry, C., Halevi, S., Smart, N.: "*Homomorphic evaluation of the AES circuit*". Cryptology ePrint Archive, Report 2012/099 (2012). This procedure is used in homomorphic encryption. As emerges clearly from the foregoing description, however, whereas the procedure of Gentry, Halevi, Smart operates on the encrypted state, in particular via homomorphic encryption, which requires selection of a large polynomial that has a special form, e.g., is cyclotomic, the method according to an embodiment advantageously does not so require. Moreover, the large polynomial of the Gentry-Halevi procedure is very large (of the order of $2^{30000}$), whereas that of the method according to an embodiment is advantageously relatively small (of the order of $2^{128}$).

Deriving from the above AES computation procedure carried out in the polynomial ring $$\frac{Z_2[z]}{(p(z))}$$

are properties that are useful as countermeasures for side-channel attacks.

In fact, the AES operations are no longer carried out on the bytes separately, but rather a change in a single bit of the polynomial before the SubBytes or MixColumns or ShiftRows operations determines a change in half of the bits of the polynomial in the result of the operation. Instead, in other types of countermeasures, a change in one byte affects only that byte, or the column if it is a MixColumns operation. In this context, the method according to an embodiment may provide the following advantages:
- the hypothesis space increases in size, assuming the size of the polynomial, e.g., in particular greater than $2^{64}$; increasing the size of the hypothesis space is in itself a new way of contrasting side-channel attacks as compared to known methods; and
- the change of a single bit of the large polynomial modifies completely the resulting bytes, rendering much more difficult indirect attacks, such as DFA attacks.

It should be noted that these advantages are already included in an embodiment of a method without using specific countermeasures. The use of the randomization bytes and of the constant check, or canary, value constitutes an additional countermeasure that can be added easily to the basic operations of an embodiment without modifying computation. It affords a defense against passive and active attacks. As regards specifically the DPA countermeasures, as indicated above, an operation 212 of randomization is carried out by adding the randomization bytes R.

In fact, the operations in the field $$\frac{Z_2[z]}{(p(z))}$$

depend upon more bits than normal AES operations; for example, each bit of $a(z)^2$ depends upon several bits of a(z). As indicated previously, the method according to an embodiment offers in itself a protection on account of the increase in the size of the hypothesis space and the dependence upon a number of bits; however, the simplest operations could even so be liable to attack. For example, an XOR with the AES key K remains a bit-by-bit XOR also in the field $$\frac{Z_2[z]}{(p(z))}.$$

Hence, there is carried out the operation 212 to provide a masking by encoding the AES state B plus the randomization bytes R.

In this case, the computation remains the same as the one described above; simply the value of the number 1 of irreducible polynomials $f_i(y)$ increases, since further rings $$\frac{Z_2[y]}{(f_i(y))}$$

are necessary for moving therein the randomization bytes R, which correspond, in the schematic representations of FIG. 2, to bytes $b_i(x)$ with $i>15$.

The fact that a change of one bit in the polynomial before a SubBytes or MixColumns or ShiftRows operation determines a change of half of the bits of the polynomial as a result of the operation is very useful as protection against error injection; however, there may be exceptions.

In order to facilitate overcoming these drawbacks, it is envisaged, as has been said, an operation 214 of addition of a constant verification or canary value C, along the same lines as in the case of the values used for detecting buffer overflow. Canary bytes C are in general bytes of a known value that are set alongside the plaintext matrix B and the randomization bytes R. In an embodiment, the canary bytes are not rotated and hence are in the same position at the end of the encryption procedure. Their value can thus be verified at the end of the computation by comparing it with an expected value. Whether they undergo or not the operations of AES encryption 240, their expected value can be predicted and, if the aforesaid final value is different from the expected value, it indicates that there has been a error injection.

It should be noted that it is possible, in variants, to apply the randomization step 212 not only to the plaintext state B, but also to the keys K, SK.

In an embodiment, the irreducible polynomials $f_i(y)$ are defined as polynomials of degree 8, which may be the minimum degree allowed that maximizes the computational speed and at the same time guarantees the isomorphism between $$\frac{Z_2[x]}{(r(x))} \text{ and } \frac{Z_2[y]}{(f_i(y))}$$

that determines simplification of the aforesaid operations of computation. It should be noted, however, that it is possible to use any multiple of 8 as degree of the irreducible polynomials $f_i(y)$, for example 16, 24, or 32.

There are moreover only 30 irreducible polynomials of degree 8 in the Galois field GF(2). Should there be many randomization bytes and canary bytes to be used, it could be useful to employ the Galois field $GF(2^{16})$, since there exist 4080 irreducible polynomials of degree 16 on GF(2).

In the method described the key schedule is computed in the normal AES space, and then there is carried out conversion of the various round keys in the field $$\frac{Z_2[z]}{(p(z))}.$$

In variants, it is possible to bring the original key into the field $$\frac{Z_2[z]}{(p(z))}$$

and compute the key schedule in $$\frac{Z_2[z]}{(p(z))}.$$

Described now in detail is an embodiment of a procedure for computing the maps $\psi_i$ and $\omega$ indicated in FIG. 3.

As regards the moving map $\psi_i$ that moves the elements $b_i(x)$, e.g., the polynomials that represent the bytes $b_i$ of the AES state B, into the elements $\alpha_i(y)$, e.g., the polynomials that represent moved bytes over the fields corresponding to the irreducible polynomials $f_i(y)$, it is possible to define an order in the fields $$\frac{Z_2[y]}{(f_i(y))}$$

through i-th maps $\phi_i$ that take from $$\frac{Z_2[y]}{(f_i(y))} \text{ to } \frac{Z_2[y]}{(f_{i+1}(y))}.$$

$$\varphi_i: \frac{Z_2[y]}{(f_i(y))} \to \frac{Z_2[y]}{(f_{i+1 \bmod l}(y))}, \alpha_i(y) \mapsto \alpha_{i+1}(\theta_i), \text{ for } i \leq 0 < l-1$$

The above map $\phi_i$ is defined by choosing a root $\theta_i$ of the polynomial $f_i(y)$ in the field $$\frac{Z_2[y]}{(f_{i+1}(y))},$$

and then, by moving an element $\alpha_i(y)$ from $$\frac{Z_2[y]}{(f_i(y))}$$

to $$\frac{Z_2[y]}{(f_{i+1}(y))},$$

the element $\alpha_i(y)$ in $\theta_i$ is evaluated in such a way that $$\alpha_{i+1}(y) = \alpha_i(\theta_i) \bmod(f_{i+1}(y))$$

It should be noted that since the irreducible polynomial $f_i(y)$ has a plurality of roots corresponding to the degree of the aforesaid polynomial, one thereof may be arbitrarily chosen. The map $\phi_{l-1}$ that takes from $$\frac{Z_2[y]}{(f_{l-1}(y))} \text{ to } \frac{Z_2[y]}{(f_0(y))}$$

is here not yet defined.

There is hence chosen a root $\rho_0$ of r(x) in $$\frac{Z_2[y]}{(f_0(y))},$$

and this defines the map $\psi_0$, as follows:

$$\psi_0: \frac{Z_2[x]}{(r(x))} \to \frac{Z_2[y]}{(f_0(y))}, b(x) \mapsto \alpha_0(y) := b(\rho_0) \bmod(f_0(y))$$

In order to define the other maps $\psi_i$ the maps $\phi_i$ are recursively used for moving the root $\rho_0$ into $$\frac{Z_2[y]}{(f_i(y))}$$

in such a way that $$\psi_i: \frac{Z_2[x]}{(r(x))} \to \frac{Z_2[y]}{(f_i(y))}$$
$$b(x) \mapsto \alpha_i(y) := b(\rho_i) \bmod (f_i(y))$$

where $\rho_i$ is defined as follows: $\rho_i := (\phi_{i-1}(\phi_{i-2}(\phi \ldots (\phi_0(\rho_0)))))$.

We can now define the map $\phi_{l-1}$ that takes from $$\frac{Z_2[y]}{(f_{l-1}(y))} \text{ to } \frac{Z_2[y]}{(f_0(y))}$$

choosing the specific root $\theta_{l-1}$, of $f_{l-1}$ in $$\frac{Z_2[y]}{(f_0(y))}$$

so that $\rho_{l-1}(\theta_{l-1}) = \rho_0$.

As regards the operations of rotation, involved, for example, in the ShiftRows operation, a rotation is an operation carried out in the ring $$\frac{Z_2[z]}{(p(z))}$$

by evaluation of a specific polynomial $\text{rot1}(z)$ that results in rotation of the input bytes. For example:

if $b_0(x), b_1(x), \ldots, b_{l-1}(x) \mapsto a(z)$, then $a(\text{rot1}(z)) \mapsto b_{l-1}(x), b_0(x), b_1(x), \ldots, b_{l-2}(x) \bmod (p(z))$ This rotation applies the map $\phi$ to each element. Recalling that each map $\phi_i$ built starting from the root $\theta_i$, the polynomial $\text{rot1}(z)$ is built by combining through the CRT all the roots $\theta_i$. It is emphasized in this context how there is consistency between the map defined by the roots $\theta_i$ and the maps $\psi_i$ (defined by the roots $\rho_i$). As indicated hereinafter, this consistency is for construction of more general permutations.

As regards the construction of permutations this can be done arbitrarily. By way of example, represented hereinafter is the ShiftRows permutation. The ShiftRows permutation modifies the position of various bytes of the AES state simultaneously; in fact, it can be described as follows:

$$\text{ShiftRows}\left(\begin{bmatrix} b_0 & b_1 & b_2 & b_3 \\ b_4 & b_5 & b_6 & b_7 \\ b_8 & b_9 & b_{10} & b_{11} \\ b_{12} & b_{13} & b_{14} & b_{15} \end{bmatrix}\right) = \begin{bmatrix} b_0 & b_1 & b_2 & b_3 \\ b_7 & b_5 & b_6 & b_4 \\ b_{10} & b_{11} & b_8 & b_9 \\ b_{15} & b_{12} & b_{13} & b_{14} \end{bmatrix}$$

To carry out this operation an operator vector having 1 elements in the various fields $$\frac{Z_2[y]}{(f_i(y))}$$

is employed, hence in particular, in the example, 16 polynomials. In this operator vector, the elements that do not correspond to a change of position (for example, with reference to the ShiftRows operation described above, the elements in position 0, 1, 2, 3) contain a value equal to the polynomial y (e.g., they contain a homogeneous monic polynomial), whereas for the other elements, which move from the position j to the position k in the state, a root $\sigma_j$ of $f_j(y)$ computed in $$\frac{Z_2[y]}{(f_k(y))}$$

is present in position k. It should be noted, that since consistency is desired, the root $\sigma_j$ is chosen as the root whereby $\rho_j(\sigma_j) = \rho_k$ applies. At this point, it is possible to obtain the map ShiftRows(z) by applying the CRT to the vector thus built. For carrying out computation of the ShiftRows operation, it will be sufficient to evaluate the state in ShiftRows(z)

ShiftedState(z) = a(ShiftRows(z)) mod(p(z))

This method can be combined to multiplications by constants, which are useful in the case of computation of the MixColumns operation, but can be generalized for any permutation, basically applying to the operations that apply arbitrary permutations the steps of:

building an operator vector with a number of elements in the various fields $$\frac{Z_2[y]}{(f_i(y))}$$

equal to the number 1 of irreducible polynomials, in the aforesaid operator vector elements that, on the basis of the operation implemented, do not change position contain the polynomial y, which is a homogeneous first-degree monic polynomial, e.g., a first-degree polynomial with unit coefficient and without constant term, whereas for the other elements, which move from a position of first index, e.g., index j, into the position of second index, e.g., index k, there is present in position k a root $\sigma_j$ of the first-index polynomial $f_j(y)$ computed in the quotient field $$\frac{Z_2[y]}{(f_k(y))}$$

of second index k, in particular this root $\sigma_j$ of the first-index polynomial $f_j(y)$ being selected as the root whereby a root $\rho_j$ of the moving map $\psi_j$ of first index j evaluated in the root $\sigma_j$ of the first-index field $f_j(y)$ is equal to a root $\rho_k$ of the moving map $\psi_k$ of second index k, in particular according to the following relation:

$\rho_j(\sigma_j) = \rho_k$;

obtaining a map of this operation with arbitrary permutations by applying to the vector thus built the aforesaid isomorphism w on the basis of the Chinese remainder theorem; and computing the operation with arbitrary permutations, evaluating the state in the above operation map.

The method according to an embodiment applies in general to data stored in data media and in particular in data stored in data media of any apparatus that implements an AES encryption system, for example in set-top boxes or smartcards. In general, this apparatus comprises or is associated to data-processing means and, in particular, comprises one or more processors.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
protecting data stored in a hardware data media from attack using Advanced Encryption Standard (AES) cyphering circuitry, the protecting including:
mapping polynomial representations in an AES finite field of bytes of a state matrix into respective fields of polynomials computed with respect to one of a plurality of irreducible polynomials, generating moved polynomials;
applying Chinese-Remainder-Theorem (CRT) based mapping to the generated moved polynomials, generating a polynomial representing the state matrix in a polynomial ring;
applying an AES process to the polynomial representing the state matrix in the polynomial ring, generating an AES-processed polynomial; and
converting the AES-processed polynomial into the AES finite field, generating an AES-processed state matrix, wherein the method includes:
obtaining the polynomial representation ($b_i(x)$) in the AES finite field $$\left(\frac{Z_2[x]}{(r(x))}\right)$$

of the input bytes ($b_i$) of said state matrix (B);
providing the plurality of irreducible polynomials ($f_i(y)$) and mapping, using a moving map ($\psi_i$), each polynomial ($b_i(x)$) of said polynomial representation into the respective field of polynomials $$\left(\frac{Z_2[y]}{(f_i(y))}\right)$$

computed with respect to one of said irreducible polynomials ($f_i(y)$), to obtain the respective moved polynomials ($\alpha_y(y)$);
mapping said moved polynomials ($\alpha_i(y)$) into a polynomial ($a(z)$) of the polynomial ring $$\left(\frac{Z_2[z]}{(p(z))}\right),$$

obtained by applying an isomorphism ($\omega$) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial ($a(z)$) representing the state matrix (B) in said polynomial ring $$\left(\frac{Z_2[z]}{(p(z))}\right);$$

applying the AES process to said polynomial ($a(z)$) that represents the state matrix (B) in said polynomial ring $$\left(\frac{Z_2[z]}{(p(z))}\right);$$

and
reconverting said polynomial ($a(z)$) that represents the state matrix (B) in said polynomial ring $$\left(\frac{Z_2[z]}{(p(z))}\right)$$

into the AES finite field $$\left(\frac{Z_2[x]}{(r(x))}\right)$$

to obtain an encrypted state matrix (CB).

2. The method of claim 1 wherein the AES process is an AES encryption process and the generated AES-processed state matrix is an encrypted state matrix.

3. The method of claim 1, comprising:
generating the state matrix, the generating the state matrix including adding one or more randomization bytes to bytes of a matrix of data to be processed.

4. The method of claim 3 wherein the generating the state matrix includes adding one or more check bytes to bytes of the matrix of data to be processed.

5. The method of claim 1, comprising:
generating the state matrix, the generating the state matrix including adding one or more check bytes to bytes of a matrix of data to be processed.

6. The method of claim 5, comprising:
verifying a check value in the AES processed state matrix corresponds to an expected value.

7. The method of claim 1 wherein said isomorphism ($\omega$) is defined as $$(\alpha_0(y), \alpha_1(y), \ldots, \alpha_{l-1}(y)) \mapsto a(z) = \sum_{i=0}^{l-1} \alpha_i(z)\left(\frac{p(z)}{f_i(z)}\right)\left[\left(\frac{p(z)}{f_i(z)}\right)^{-1}\right]_{f_i(z)}.$$

8. The method of claim 4 wherein a number of the plurality of irreducible polynomials is equal to a sum of a number of bytes of the AES state matrix (B), of a number of added randomization bytes, and of a number of added check bytes.

9. The method of claim 3, comprising adding one or more randomization bytes to keys of the AES process.

10. The method claim 1 wherein said applying an AES process comprises mapping a key into the polynomial ring.

11. The method of claim 1, wherein a ShiftRows operation of the AES procedure comprises:
building an operator vector having elements in fields $$\left(\frac{Z_2[y]}{(f_i(y))}\right),$$

a number of which is equal to a number of irreducible polynomials of the plurality of irreducible polynomials and using arbitrary permutations of the elements, wherein elements that do not change position contain a homogeneous first-degree monic polynomial (y), and elements which change from a position of first index (j) to a position of second index (k), there is present, in the position (k) of the operator vector, a root ($\sigma_j$) of a first-index polynomial ($f_j(y)$)) computed in a quotient field $$\left(\frac{Z_2[y]}{(f_k(y))}\right)$$

of second index (k), said root ($\sigma_j$) of the first-index polynomial ($f_j(y)$)) being selected as the root whereby a root ($\rho_j$) of a moving map ($\psi_j$) of first index (j) evaluated in said root ($\sigma_j$) of the first-index polynomial ($f_j(y)$)) is equal to a root ($\rho_k$) of the moving map ($\psi_k$) of said second index (k), according to the following relation:

$\rho_j(\sigma_j)=\rho_k$;

obtaining a map of said operation with arbitrary permutations (ShiftRows(z)) by applying to said vector said isomorphism ($\omega$) based upon the Chinese remainder theorem; and computing the operation with arbitrary permutations evaluating the state in said operation map (ShiftRows (z)).

12. A device, comprising:
one or more memories; and
one or more processing devices including Advanced Encryption Standard (AES) cyphering circuitry, wherein the one or more memories and the AES cyphering circuitry are configured to protect data stored in a hardware data media from attack by:
mapping polynomial representations in an AES finite field of bytes of a state matrix into respective fields of polynomials computed with respect to one of a plurality of irreducible polynomials, generating moved polynomials;
applying Chinese-Remainder-Theorem (CRT) based mapping to the generated moved polynomials, generating a polynomial representing the state matrix in a polynomial ring;
applying an AES process to the polynomial representing the state matrix in the polynomial ring, generating an AES-processed polynomial; and
converting the AES-processed polynomial into the AES finite field, generating an AES-processed state matrix, wherein the one or more memories and the one or more processing devices are configured to:
obtain the polynomial representation ($b_i(x)$) in the AES finite field $$\left(\frac{Z_2[x]}{(r(x))}\right)$$

of the input bytes ($b_i$) of said state matrix (B);
provide the plurality of irreducible polynomials ($f_i(y)$) and map, using a moving map ($\psi_i$), each polynomial ($b_i(x)$) of said polynomial representation into the respective field of polynomials $$\left(\frac{Z_2[y]}{(f_i(y))}\right)$$

computed with respect to one of said irreducible polynomials ($f_i(y)$), to obtain the respective moved polynomials ($\alpha_i(y)$);
map said moved polynomials ($\alpha_i(y)$) into a polynomial ($a(z)$) of the polynomial ring $$\left(\frac{Z_2[z]}{(p(z))}\right),$$

obtained by applying an isomorphism ($\omega$) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial (a(z)) representing the state matrix (B) in said polynomial ring $$\left(\frac{Z_2[z]}{(p(z))}\right);$$

apply the AES process to said polynomial (a(z)) that represents the state matrix (B) in said polynomial ring $$\left(\frac{Z_2[z]}{(p(z))}\right);$$

and
reconvert said polynomial (a(z)) that represents the state matrix (B) in said polynomial ring $$\left(\frac{Z_2[z]}{(p(z))}\right)$$

into the AES finite field $$\left(\frac{Z_2[x]}{(r(x))}\right)$$

to obtain an encrypted state matrix (CB).

13. The device of claim 12 wherein the AES process is an AES encryption process and the generated AES-processed state matrix is an encrypted state matrix.

14. The device of claim 12 wherein the one or more memories and the one or more processing devices are configured to:
generate the state matrix, the generating the state matrix including adding one or more randomization bytes to bytes of a matrix of data to be processed.

15. The device of claim 14 wherein the generating the state matrix includes adding one or more check bytes to bytes of the matrix of data to be processed.

16. The device of claim 12 wherein the one or more memories and the one or more processing devices are configured to:
generating the state matrix, the generating the state matrix including adding one or more check bytes to bytes of a matrix of data to be processed.

17. The device of claim 16 wherein the one or more memories and the one or more processing devices are configured to:
verifying a check value in the AES processed state matrix corresponds to an expected value.

18. The device of claim 12 wherein said isomorphism ($\omega$) is defined as $$(\alpha_0(y), \alpha_1(y), \ldots, \alpha_{l-1}(y)) \mapsto a(z) = \sum_{i=0}^{l-1} \alpha_i(z)\left(\frac{p(z)}{f_i(z)}\right)\left[\left(\frac{p(z)}{f_i(z)}\right)^{-1}\right]_{f_i(z)}.$$

19. A system, comprising:
an interface configured to receive and output data; and
Advanced Encryption Standard (AES) cyphering circuitry coupled to the interface and configured to protect data stored in a hardware data media from attack by:
maping polynomial representations in an AES finite field of bytes of a state matrix into respective fields of polynomials computed with respect to one of a plurality of irreducible polynomials, generating moved polynomials;
applying Chinese-Remainder-Theorem (CRT) based mapping to the generated moved polynomials, generating a polynomial representing the state matrix in a polynomial ring;
applying an AES process to the polynomial representing the state matrix in the polynomial ring, generating an AES-processed polynomial; and
converting the AES-processed polynomial into the AES finite field, generating an AES-processed state matrix
wherein the cyphering circuitry is configured to:
obtain the polynomial representation (b (x)) in the AES finite field $$\left(\frac{Z_2[x]}{(r(x))}\right)$$

of the input bytes ($b_i$) of said state matrix (B);
provide the plurality of irreducible polynomials ($f_i(y)$) and map, using a moving map ($\psi_i$), each polynomial ($b_i(x)$) of said polynomial representation into the respective field of polynomials $$\left(\frac{Z_2[y]}{(f_i(y))}\right)$$

computed with respect to one of said irreducible polynomials
($f_i(y)$), to obtain the respective moved polynomials ($\alpha_i(y)$);
map said moved polynomials ($\alpha_i(y)$) into a polynomial (a(z)) of the polynomial ring $$\left(\frac{Z_2[z]}{(p(z))}\right),$$

obtained by applying an isomorphism ($\omega$) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial (a(z)) representing the state matrix (B) in said polynomial ring $$\left(\frac{Z_2[z]}{(p(z))}\right);$$

apply the AES process to said polynomial (a(z)) that represents the state matrix (B) in said polynomial ring $$\left(\frac{Z_2[z]}{(p(z))}\right);$$

and
reconvert said polynomial (a(z)) that represents the state matrix (B) in said polynomial ring $$\left(\frac{Z_2[z]}{(p(z))}\right)$$

into the AES finite field $$\left(\frac{Z_2[x]}{(r(x))}\right)$$

to obtain an encrypted state matrix (CB).

20. The system of claim 19 wherein the AES process is an AES decryption process and the generated AES-processed state matrix is a decrypted state matrix.

21. The system of claim 19, comprising at least one of:
smart-card circuitry; and
set-top box circuitry.

22. A non-transitory computer-readable medium having contents which configure an Advanced Encryption Standard (AES) cyphering circuit to protect data stored in a hardware data media from attack by performing a method, the method comprising:
mapping polynomial representations in an AES finite field of bytes of a state matrix into respective fields of polynomials computed with respect to one of a plurality of irreducible polynomials, generating moved polynomials;
applying Chinese-Remainder-Theorem (CRT) based mapping to the generated moved polynomials, generating a polynomial representing the state matrix in a polynomial ring;
applying an AES process to the polynomial representing the state matrix in the polynomial ring, generating an AES-processed polynomial; and
converting the AES-processed polynomial into the AES finite field, generating an AES-processed state matrix, wherein the method includes:
obtaining the polynomial representation ($b_i$x)) in the AES finite field $$\left(\frac{Z_2[x]}{(r(x))}\right)$$

of the input bytes ($b_i$) of said state matrix (B);
providing the plurality of irreducible polynomials ($f_i$((y)) and mapping, using a moving map ($\psi_i$) each polynomial ($b_i$(x)) of said polynomial representation into the respective field of polynomials $$\left(\frac{Z_2[y]}{(f_i(y))}\right)$$

computed with respect to one of said irreducible polynomials
($f_i$(y)), to obtain the respective moved polynomials ($\alpha_i$(y));
mapping said moved polynomials ($\alpha_i$(y)) into a polynomial (a(z)) of the polynomial ring $$\left(\frac{Z_2[z]}{(p(z))}\right),$$

obtained by applying an isomorphism ($\omega$) between the direct product of said fields of polynomials $$\left(\frac{Z_2[y]}{(f_i(y))}\right)$$

and said polynomial ring $$\left(\frac{Z_2[z]}{(p(z))}\right)$$

based upon the Chinese remainder theorem (CRT), said polynomial (a(z)) representing the state matrix (B) in said polynomial ring $$\left(\frac{Z_2[z]}{(p(z))}\right);$$

applying the AES process to said polynomial (a(z)) that represents the state matrix (B) in said polynomial ring $$\left(\frac{Z_2[z]}{(p(z))}\right);$$

and
reconverting said polynomial (a(z)) that represents the state matrix (B) in said polynomial ring $$\left(\frac{Z_2[z]}{(p(z))}\right)$$

into the AES finite field $$\left(\frac{Z_2[x]}{(r(x))}\right)$$

to obtain an encrypted state matrix (CB).

23. The medium of claim 22 wherein the AES process is an AES decryption process and the generated AES-processed state matrix is a decrypted state matrix.

\* \* \* \* \*